(12) United States Patent
Jackson et al.

(10) Patent No.: US 8,862,704 B2
(45) Date of Patent: Oct. 14, 2014

(54) DYNAMIC FUSION MANAGEMENT (75) Inventors: Paul R. Jackson, Ballwin, MO (US);
John C. Knutti, Chesterfield, MO (US);
Steven A. Lien, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 1370 days.

(21) Appl. No.: 12/339,031

(22) Filed: Dec. 18, 2008

(65) Prior Publication Data

US 2010/0161784 A1 Jun. 24, 2010

(51) Int. Cl.
*G06F 15/173* (2006.01)
*G06F 15/177* (2006.01)

(52) U.S. Cl.
USPC .......................................... 709/221; 709/224

(58) Field of Classification Search
USPC .......................................... 709/204, 221, 224
See application file for complete search history.

(56) References Cited

U.S. PATENT DOCUMENTS

| | | | |
|---|---|---|---|
| 6,735,630 B1 * | 5/2004 | Gelvin et al. ................. | 709/224 |
| 7,035,240 B1 * | 4/2006 | Balakrishnan et al. ....... | 370/338 |
| 2002/0169846 A1 * | 11/2002 | Chen et al. .................... | 709/209 |
| 2003/0063585 A1 * | 4/2003 | Younis et al. ................. | 370/331 |

OTHER PUBLICATIONS

Wendi Rabiner Heinzelman, Joanna Kulik, and Hari Balakrishnan. 1999. Adaptive protocols for information dissemination in wireless sensor networks. In Proceedings of the 5th annual ACM/IEEE international conference on Mobile computing and networking (MobiCom '99). ACM, New York, NY, USA, 174-185.*
Yang Chen, Wenrui Zhao, Mostafa Ammar, and Ellen Zegura, "Hybrid Routing in Clustered DTNs with Message Ferrying", MobiOpp'07, Jun. 11, 2007, pp. 75-82.*
He et al. "AIDA: Adaptive application-independent data aggregation in wireless sensor networks", ACM Transactions on Embedded Computing Systems, vol. 3, No. 2, May 2004, pp. 426-457.*
Zhao et al., "Information-Driven Dynamic Sensor Collaboration for Tracking Applications", IEEE Signal Processing Magazine, Mar. 2002, pp. 1-9.*
Gupta et al., "Load-balanced Clustering of Wireless Sensor Networks", IEEE International Conference on Communications, 2003, pp. 1848-1852.*
Matteucci, M., "A Tutorial on Clustering Algorithms", http://home.dei.polimi.it/matteucc/Clustering/tutorial_html/index.html, Last checked Mar. 3, 2009.
Johnson, S. C, "Hierarchical Clustering Schemes", Psychometrika, vol. 32, No. 3, p. 241-254, Sep. 1967, Springer, NY.

* cited by examiner

*Primary Examiner* — Ebrahim Golabbakhsh
(74) *Attorney, Agent, or Firm* — Dan Brecht (57) ABSTRACT

A system and method for managing a network of nodes that share sensor data is presented. In one embodiment, the system and method clusters groups of nodes into subnets. Nodes in a common subnet share sensor data with other nodes in the subnet at one rate, while nodes that are not in a common subnet share sensor data at a second substantially reduced rate.

16 Claims, 5 Drawing Sheets

DYNAMIC FUSION MANAGEMENT

FIELD

Embodiments of the subject matter described herein relate generally to a system and method for optimizing utilization of bandwidth and computational resources of communications systems that share sensor data.

BACKGROUND

Sensor platforms, also referred to as nodes or virtual nodes, share sensor information across communications links that are generally not managed by the application at the physical layer. As the number of nodes increases, the volume of traffic increases, taxing the bandwidth capacity of communications links and the computational capacity of the nodes to process the shared sensor information. Prior art solutions assign groups of nodes into smaller operating groups or subnets. Typically this assignment of operating groups or subnets is performed manually. Nodes within a subnet share sensor information, while nodes in different subnets do not directly share information with each other.

Generally subnets are designed to be small enough that sharing sensor data between nodes does not overwhelm the processing capability of any individual node or the communications links between nodes. If the sensor bandwidth is not correctly anticipated or the subnets are not properly designed, nodes can become overwhelmed with sensor data and associated data communications links between nodes can become congested. This can result in delays of important sensor data reaching a node or in the data not being communicated to the node at all.

A target tracker receives sensor data about one or more targets from multiple nodes and fuses the sensor data about common targets from the multiple nodes. Typically the target tracker is configured statically and attempts to keep up with the flow of sensor reports it receives. If more reports are received than the target tracker can process, the target tracker will fall behind, delaying the assimilation of sensor reports into useful tracking data. If the flow of sensor reports is sustained at a greater rate than can be processes, the target tracker will drop reports. Important sensor data therefore would not be fused into the tracking data for one or more tracked targets.

Advantages over the prior art are herewith provided in the following disclosure.

SUMMARY

Presented is a system and method for optimizing data fusion between nodes sharing sensor data. The system and method manages sensor nodes that share their sensor data with other sensor nodes and configures the virtual fusion nodes to prevent sensor data from overwhelming processing resources on the nodes and causing congestion on communication links between nodes. In various embodiments, the system and method reduces network latencies, reduces computation loads on sensor nodes, and reduces bandwidth consumption on communications links.

In one embodiment of the system and method, a Computational Resource Manager (CRM) manages bandwidth consumption in a network of nodes performing data fusion. The CRM applies a dynamic clustering algorithm to group nodes into subnets, thereby reducing the number of sensor reports communicated between nodes in different subnets, and reducing overall network bandwidth consumption. In another embodiment of the system and method, feedback loops allow the Fusion Monitor (FM) to monitor the computational load on the target tracker and adjust the target tracking algorithms to the volume of sensor data reports received by the target tracker, the data accuracy requirement, the data priority, and the objective system operational requirements. In yet another embodiment, the system and method drops sensor data reports in order to minimize the latency of the sensor reports shared by the target tracker.

The features, functions, and advantages discussed can be achieved independently in various embodiments of the present invention or may be combined in yet other embodiments further details of which can be see with reference to the following description and drawings.

BRIEF DESCRIPTION OF THE DRAWINGS

The accompanying figures depict various embodiments of the dynamic fusion management system and method. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

The Computational Resource Manager (CRM)

Figure 1:
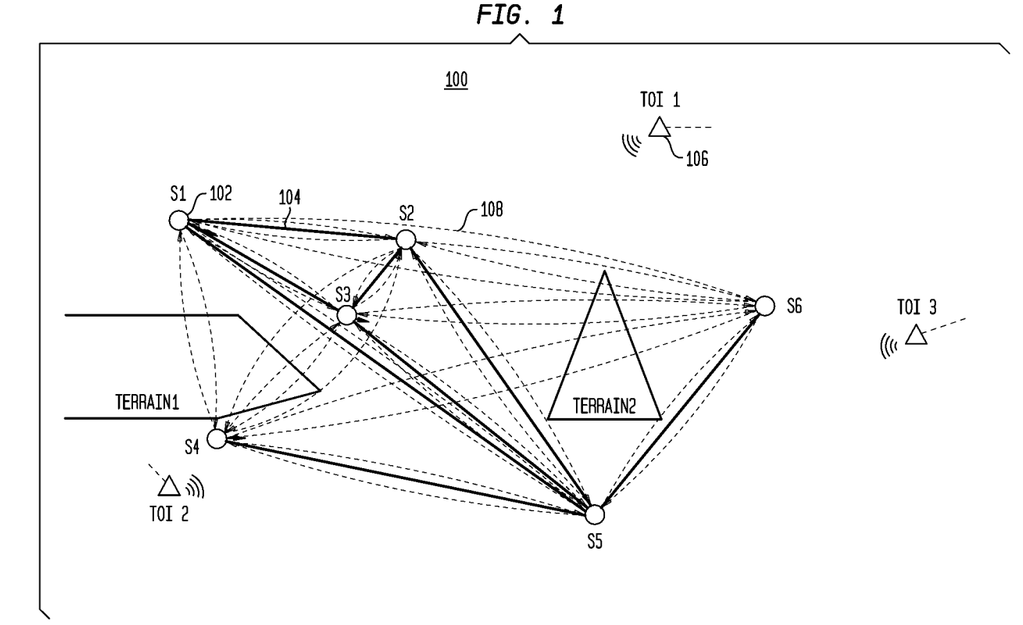
FIG. 1 is an illustration of a sensor network prior to dynamic fusion management.

Referring to FIG. 1, sensor platforms, or nodes 102, share sensor messages 108 having information about targets of interest, or targets 106, with each other node 102 across communications links 104. Every node 102 shares sensor messages 108 with every other node 102. As the number of nodes 102 increases, the number of sensor messages 108 in the sensor network 100 increases nearly exponentially. For example, N nodes 102 will send N factorial (N!) sensor messages 108 across the sensor network 100.

Figure 2:
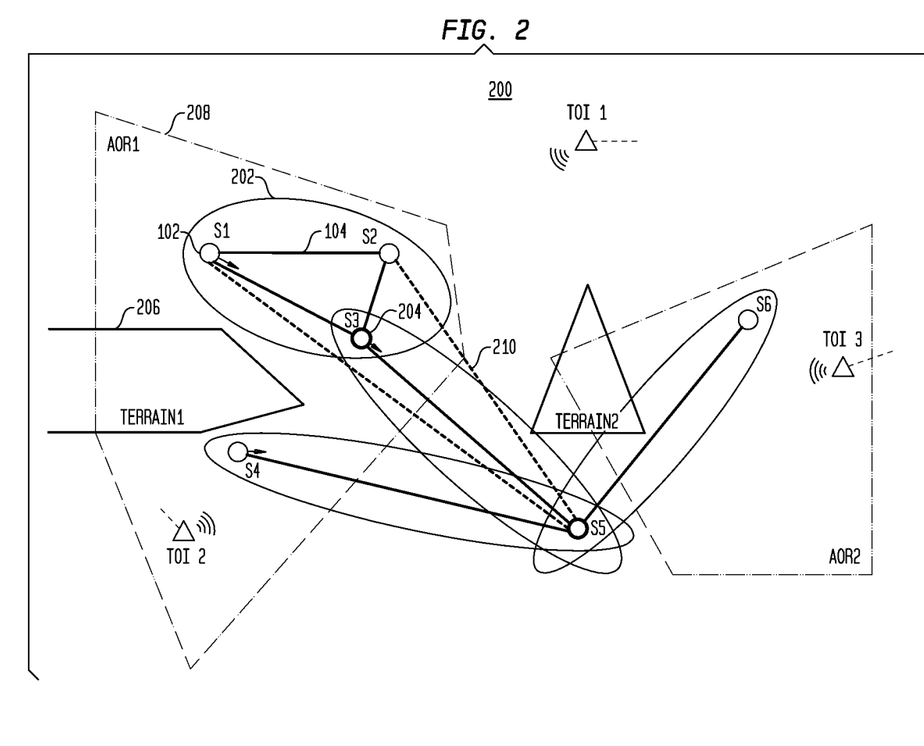
FIG. 2 is an illustration of a sensor network with dynamic subnets of one embodiment of the dynamic fusion management system and method.
Figure 3:
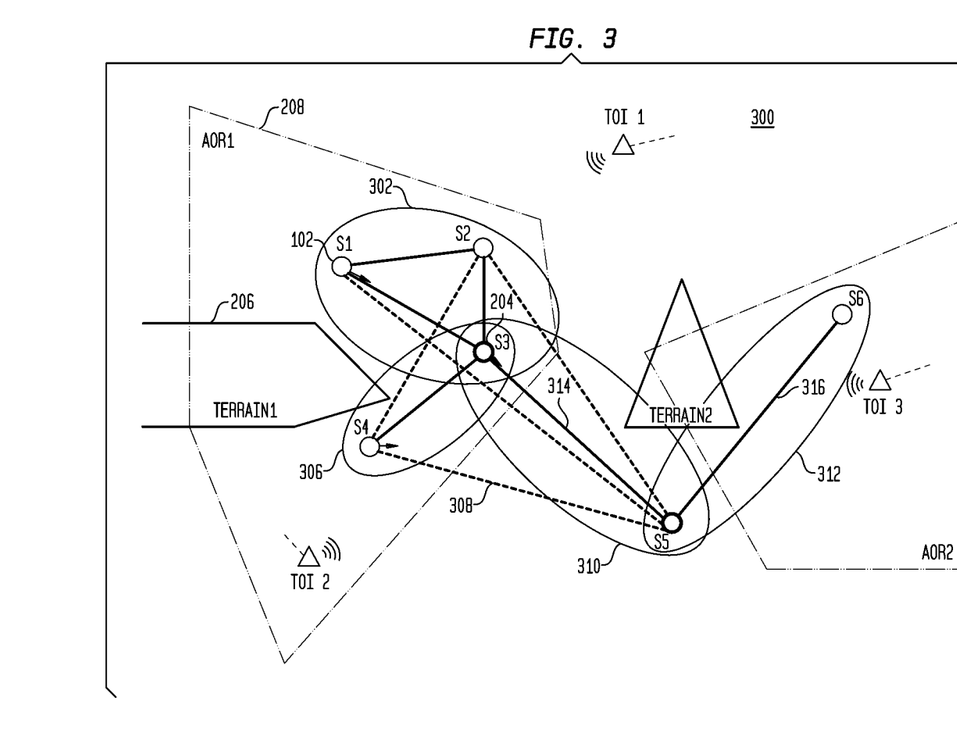
FIG. 3 is an illustration of the sensor network with dynamic subnets created by a modified hierarchical algorithm of one embodiment of the dynamic fusion management system and method.
Figure 4:
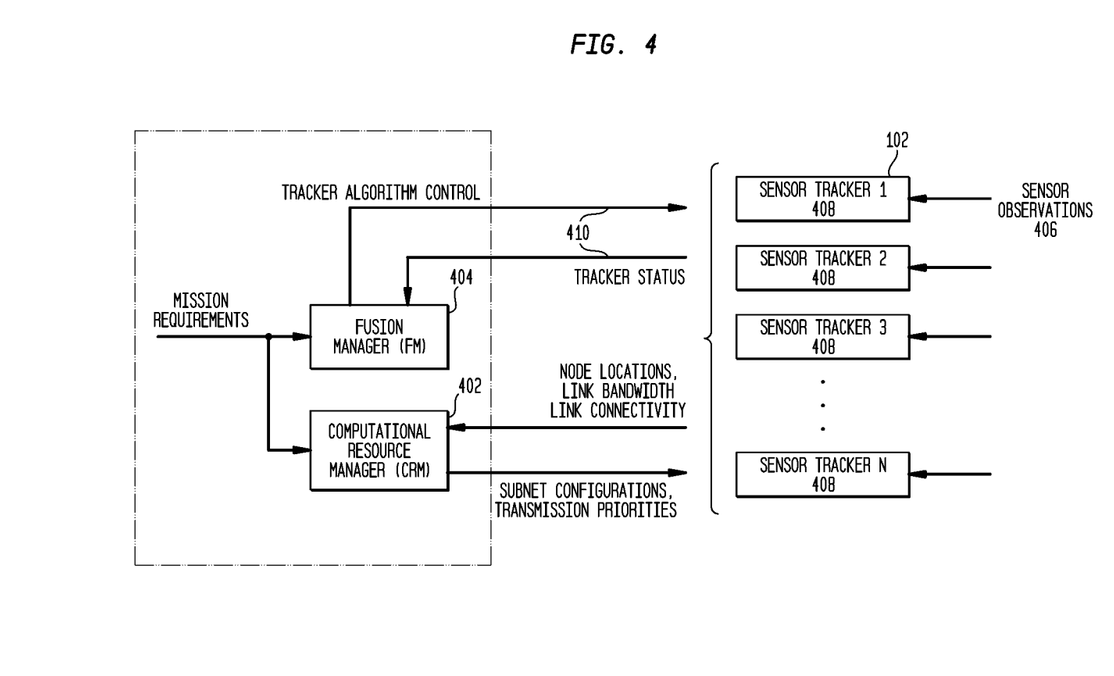
FIG. 4 is an illustration of the functional relationship of the computation resource manager and fusion manager in one embodiment of the dynamic fusion management system and method.

Referring now to FIGS. 2, 3, and 4 the Computational Resource Manager 402 (CRM) determines which nodes 102 should be clustered into logical groupings of nodes, or subnets 202, for sharing of sensor data 406 (not shown). The CRM 402 periodically utilizes a modified hierarchical clustering algorithm to determine which nodes 102 can be advantageously grouped together into a subnet 202. The modified hierarchical clustering algorithm differs from a manually assigned subnet grouping in that the modified hierarchical clustering algorithm takes into account the present environment of the dynamically changing sensor network 200 when assigning nodes 102 to subnets 202, rather than merely dividing the nodes 102 into subnets 202 irregardless of the environment of the dynamically changing sensor network 200.

To create a track of a target 106, sensor nodes 102 share sensor messages 108 having sensor data 406 with other sensor nodes 102, and the sensor data 406 is fused in the tracker 408 to create an estimated position, velocity and sometimes identification of the target 106. The sensor data 406 can come from a variety of different sensors, both fixed and mobile, such as radar, for example from a phased array antenna, IR sensors, airplane transponders, IFF (Identify Friend-or-Foe) receivers, or triangulation of passive emitters. The sensor data 406 can also be communicated across different data networks, non-limiting examples including TCP/IP, Link 16, and Military VMF networks. While data networks such as TCP/IP generally utilize higher capacity communication links 104, such as 1.544 Mb/s T1 links, data networks such as Link 11 utilize lower capacity communication links 104 such as 25 kb/s to 115 kb/s and are therefore more susceptible to congestion if there are many sensors nodes 102 attempting to share sensor data 406.

In one embodiment, to reduce the volume of sensor data 406 and sensor messages 108, sensor nodes 102 within the subnet 202 share sensor data 406 and sensor messages 108 with other sensor nodes 102 in the subnet 202 at a high rate, and sensor data 406 and sensor messages 108 with sensor nodes 102 outside of the subnet 202 at a lower rate. For example, sensor nodes 102 within a subnet 202 share sensor data 406 and sensor messages 108 with every other sensor node 102 in the subnet 202 at a rate of 1 per second, but sensor data 406 and sensor messages 108 with sensor nodes 102 outside the subnet 202 every 10 seconds. This reduces subnet-to-subnet sensor data 406 and sensor messages 108 by a factor of 10, while still allowing every node 102 to still send sensor data 406 to other nodes 102. Sensor nodes 102 typically share sensor data 406 and sensor messages 108 inside the subnet 202 at a rate that is 2 to 20 times the rate shared with sensor nodes 102 outside the subnet 202, however other rates are contemplated.

In another embodiment, one or more nodes 102 are designated as gateway nodes 204. Gateway nodes send sensor data 406 messages outside the subnet 202 and other nodes 102 in the subnet 202 do not transmit outside the subnet 202. Because communications are made through gateway nodes 204, there are unutilized communications links 210 between nodes 102 of different subnets 202 that are not gateway nodes 204. In various embodiments, either in combination or separately, using subnets 202, gateway nodes 204, and reducing inter-node message rate reduces the volume of sensor data 406 and sensor messages 108 sent by nodes 102 inside the subnet 202 to nodes 102 outside the subnet 202, thereby reducing the overall network bandwidth in the dynamically changing sensor network 200.

In one embodiment, the CRM 402 assigns nodes 102 to subnets based on changes in the environment, for example due to jamming or terrain 206 obscurations between nodes preventing them from communicating. In this case, a "max double" distance is used in the input weighting table to the modified clustering algorithm, which will prevent them from being clustered into the same subnet. In another embodiment, the CRM 402 assigns nodes 102 to subnets based on the spatial relationship of nodes 102 to one another. Nodes 102 that are further apart are less likely to share common target sensor data 406 that needs to be fused to produce a track of a target 106, and therefore the sensor data 406 can be shared at a lower rate. In another embodiment, the CRM 402 determines whether two nodes 102 have a common Area of Responsibility (AOR) 208 in determining the distance between nodes 102. Nodes 102 with common mission responsibilities ideally should be grouped in common subnets 202. Because nodes 102 move over time and environments change, the CRM 402 periodically runs the modified clustering algorithm, reassigning nodes 102 to different subnets 202 as necessary to maintain efficient communications between nodes 102. In one embodiment, the CRM 402 repeatedly runs the modified clustering algorithm and assigns nodes 102 to subnets 202 multiple times per minute, for example every 10 seconds. In this way, the CRM 402 dynamically adjusts the subnets 202 to optimize the dynamically changing network 200 to the changing environmental conditions.

The main input to the modified clustering algorithm is a weighting table between nodes 102. In one embodiment, the closer in physical proximity the two nodes 102 are together, the lower the weight, and the farther away two nodes 102 are from each other, the higher the weight. The clustering algorithm also has a "max double" input to indicate that nodes 102 should never be clustered together.

Referring now to FIG. 4, in another embodiment, there are several inputs to the weighting table, which, for convenience only, are normalized so the sum of each of the three across all nodes 102 is 1.0. There are provisions to allow for relative weighting of the three inputs:

1.) Euclidian distance—difference between the xyz positions of the nodes 102;
2.) Area of Responsibility 602 (AOR)—whether the two nodes 102 share the same AOR 602; and
3.) Node connectivity—how long the nodes 102 have been connected to each other or max double if they currently don't have a connection. This weight is proportional to time if they have connectivity, and "max double" if the nodes 102 do not have connectivity.

This approach is efficient for grouping nodes, taking into account that some nodes 102 should not be clustered together into subnets 102 due to communication issues or other factors. An exemplary hierarchical clustering algorithm is available at http://home.dei.polimi.it/matteucc/Clustering/tutorial_html/hierarchical.html. In one embodiment, a modification of this algorithm is the use of a unique value in the weighting table, designated as "max double", to prevent certain nodes 102 from being clustered together in the same subnet 202 if it is inappropriate to do so based upon environmental conditions.

Continuing to refer to FIG. 4, in one embodiment, the modified clustering algorithm of the present disclosure leverages the "max double" value to prevent certain nodes 102 from being clustered into subnets 202, and exits the modified clustering algorithm when no more clusters can be formed without violating this constraint. In the modified clustering algorithm, the N*N proximity matrix is D=[d(i,j)]. The clusterings are assigned sequence numbers 0, 1, . . . , (n−1) and L(k) is the level of the kth clustering. A cluster with sequence number m is denoted (m) and the proximity between clusters (r) and (s) is denoted d [(r),(s)].

The modified clustering algorithm comprises the following steps:
1. Begin with the disjoint clustering having level L(0)=0 and sequence number m=0.
2. Find the least dissimilar pair of clusters in the current clustering, say pair (r), (s), according to:

$d[(r),(s)] = \min d[(i),(j)]$, where the minimum is over all pairs of clusters in the current clustering.

3. Determine if the distance d equals the max double value. If so, stop, as the number of clusters cannot be reduced any further.
4. Increment the sequence number: m=m+1. Merge clusters (r) and (s) into a single cluster to form the next clustering m. Set the level of this clustering to $L(m) = d[(r),(s)]$.

5. Update the proximity matrix, D, by deleting the rows and columns corresponding to clusters (r) and (s) and adding a row and column corresponding to the newly formed cluster. The proximity between the new cluster, denoted (r,s) and old cluster (k) is defined in this way:

$d[(k),(r,s)] = \min d[(k),(r)], d[(k),(s)]$

If the weight of either row/column being combined is set to max double, preserve the this max double value in the combined weight in the new d[(k), (r,s)].

6. If all objects are in one cluster, stop; else go to step 2.

For example, a weighting table created for five nodes is a 5-by-5 table since there are five nodes, with nodes 1 thru 5 corresponding to the rows and columns of the table. Table 1 shows example distance weights for a weighting table, before normalization and weighting:

TABLE 1

|        | Node 1  | Node 2  | Node 3  | Node 4  | Node 5  |
|--------|---------|---------|---------|---------|---------|
| Node 1 | 0.00    | 2179.23 | 1308.53 | 2120.78 | 2491.16 |
| Node 2 | 2179.23 | 0.00    | 2950.25 | 3452.91 | 929.50  |
| Node 3 | 1308.53 | 2950.25 | 0.00    | 832.80  | 2844.00 |
| Node 4 | 2120.78 | 3452.91 | 832.80  | 0.00    | 3132.63 |
| Node 5 | 2491.16 | 929.50  | 2844.00 | 3132.63 | 0.00    |

Table 2 shows example distance weights for a weighting table, after normalization and weighting:

TABLE 2

|        | Node 1 | Node 2 | Node 3 | Node 4 | Node 5 |
|--------|--------|--------|--------|--------|--------|
| Node 1 | 0.00   | 0.10   | 0.06   | 0.10   | 0.11   |
| Node 2 | 0.10   | 0.00   | 0.13   | 0.16   | 0.04   |
| Node 3 | 0.06   | 0.13   | 0.00   | 0.04   | 0.13   |
| Node 4 | 0.10   | 0.16   | 0.04   | 0.00   | 0.14   |
| Node 5 | 0.11   | 0.04   | 0.13   | 0.14   | 0.00   |

Table 3 shows example AOR 208 weights for a weighting table, before normalization and weighting:

TABLE 3

|        | Node 1 | Node 2 | Node 3 | Node 4 | Node 5 |
|--------|--------|--------|--------|--------|--------|
| Node 1 | 0.00   | 1.00   | 1.00   | 0.50   | 0.50   |
| Node 2 | 1.00   | 0.00   | 1.00   | 0.50   | 0.50   |
| Node 3 | 1.00   | 1.00   | 0.00   | 0.50   | 0.50   |
| Node 4 | 0.50   | 0.50   | 0.50   | 0.00   | 0.50   |
| Node 5 | 0.50   | 0.50   | 0.50   | 0.50   | 0.00   |

Table 4 shows example AOR 208 weights for a weighting table, after normalization and weighting:

TABLE 4

|        | Node 1 | Node 2 | Node 3 | Node 4 | Node 5 |
|--------|--------|--------|--------|--------|--------|
| Node 1 | 0.00   | 0.15   | 0.15   | 0.08   | 0.08   |
| Node 2 | 0.15   | 0.00   | 0.15   | 0.08   | 0.08   |
| Node 3 | 0.15   | 0.15   | 0.00   | 0.08   | 0.08   |
| Node 4 | 0.08   | 0.08   | 0.08   | 0.00   | 0.08   |
| Node 5 | 0.08   | 0.08   | 0.08   | 0.08   | 0.00   |

Table 5 shows example connection or communication link 104 weights for a weighting table, before normalization and weighting:

TABLE 5

|        | Node 1 | Node 2 | Node 3 | Node 4 | Node 5 |
|--------|--------|--------|--------|--------|--------|
| Node 1 | 0.00   | max    | 1.00   | 1.00   | 0.03   |
| Node 2 | max    | 0.00   | max    | 1.00   | 1.00   |
| Node 3 | 1.00   | max    | 0.00   | 1.00   | 1.00   |
| Node 4 | 1.00   | 1.00   | 1.00   | 0.00   | 1.00   |
| Node 5 | 0.03   | 1.00   | 1.00   | 1.00   | 0.00   |

Utilizing "max" weights precludes clustering of some nodes 102 due to lack of connectivity between nodes 1 and 2, and 2 and 3. Table 6 shows example connection or communication link 104 weights for a weighting table, after normalization and weighting:

TABLE 6

|        | Node 1 | Node 2 | Node 3 | Node 4 | Node 5 |
|--------|--------|--------|--------|--------|--------|
| Node 1 | 0.00   | max    | 0.00   | 0.00   | 0.00   |
| Node 2 | max    | 0.00   | max    | 0.00   | 0.00   |
| Node 3 | 0.00   | max    | 0.00   | 0.00   | 0.00   |
| Node 4 | 0.00   | 0.00   | 0.00   | 0.00   | 0.00   |
| Node 5 | 0.00   | 0.00   | 0.00   | 0.00   | 0.00   |

Table 7 shows an example combined weighting table:

TABLE 7

|        | Node 1 | Node 2 | Node 3 | Node 4 | Node 5 |
|--------|--------|--------|--------|--------|--------|
| Node 1 | 0.00   | max    | 0.21   | 0.17   | 0.19   |
| Node 2 | max    | 0.00   | max    | 0.23   | 0.12   |
| Node 3 | 0.21   | max    | 0.00   | 0.11   | 0.20   |
| Node 4 | 0.17   | 0.23   | 0.11   | 0.00   | 0.22   |
| Node 5 | 0.19   | 0.12   | 0.20   | 0.22   | 0.00   |

Upon running the modified clustering algorithm, the output clusters are as follows. Cluster 0 contains nodes 1, 3, and 4; Cluster 1 contains nodes 2, and 5. Nodes 1, 3, and 4 therefore are grouped into one subnet 202, and nodes 2 and 5 become a second subnet 202. A gateway node 204 is selected using the closest node 102 between the two subnets 202 using the same weighting table as is used for the hierarchical clustering algorithm. The two nodes 102 with the shortest distance, or lowest weight, between them are found by looping through the weighting table. The node 102 in the larger subnet 202 is designated a gateway node 204.

Referring now to FIGS. 2 and 3, a more visual example of this algorithm is presented for purposes of illustration only. In FIG. 2, in the dynamically changing sensor network 200, there is no direct communication between the node 102 designated as S4 and the node 102 designated as S3 due to intervening terrain 206. In FIG. 3, in the updated sensor network 300, the nodes 102 have moved spatially and the terrain 206 is no longer blocking potential communications between the node 102 designated S4 and the node 102 designated as S3. The algorithm dynamically adjusts the subnets 102 and communication links 104. (a) Nodes 102 designated S1, S2 and S3 are in close proximity, share past node connectivity links 104, and share a common AOR 208. Therefore nodes 102 designated S1, S2 and S3 share subnet 302. (b) Nodes designated S3 and S4 are in close proximity and share a common AOR 208. However, node 102 designated S4 did not previously have a direct communications path (i.e., new communications link 304) in FIG. 2 due to the blocking terrain 206. Therefore, the node 102 designated S4 is not placed in subnet 302, but instead shares a new subnet 306 with node 102 designated S3. (c) For similar reasons, nodes designated S3 and S4 communicate via new communications link 304 instead of using previous communications link 308. (d) Nodes 102 designated S3 and S5 form subnet 310 form subnet 312 because they share previous communication link 314. (e) Nodes designated S5 and S6 form subnet 312 because they share previous communication link 316. Note that nodes 102 designated S5 and S6 are not placed in subnet 302 or subnet 304 because they are not in the same AOR 208.

The Fusion Manager (FM)

In another embodiment, the Fusion Manager 404 (FM) uses a feedback control loop 410 to control each tracker 408 it is managing. The FM 404 monitors the incoming report rate and the tracker's 408 current processing rate. The FM 404 determines when to attempt to change tracker 408 mode, either to obtain a faster mode if the tracker 408 is not able to process all incoming tracks using the current mode, or a higher quality mode, if the incoming report rate is less than what the tracker's 408 current mode can handle. In one embodiment, the tracker 408 can swap between 1:N tracks when the report rate is high compared what the tracker 408 can handle and N:M tracks if the tracker 408 can support the additional tracks, and MHT if the tracker 408 has excess processing capacity. In another embodiment, the tracker 408 can switch modes between Greedy, Lagrange, and Munkres data fusion algorithms depending upon the tracker's 408 current data fusion capacity. The FM 404 can also drop a certain percentage of incoming reports when that is necessary to avoid overloading the tracker 408 and causing too high a latency between a report arriving at the tracker 408 and the tracker 408 being able to fuse it.

In one embodiment, the FM 404 selects sensor reports on the tracker 408 to be dropped based upon age of the sensor report and identification that the target is a target of interest, as specified in the mission requirements. Rather than configure a tracker 408 statically, the FM 404 dynamically selects the appropriate queue parameters for dropping or prioritizing sensor data 408 reports depending upon the ability of the tracker 408 to keep up with the incoming sensor data 406 measurements, the age of the sensor data 408 reports, and the identification of the target 106 in the sensor data 406 reports. This selective prioritization and sensor data 406 report dropping strategy results in improved latency management of important sensor data 406 and faster fusion of mission critical sensor data 406.

Figure 5:
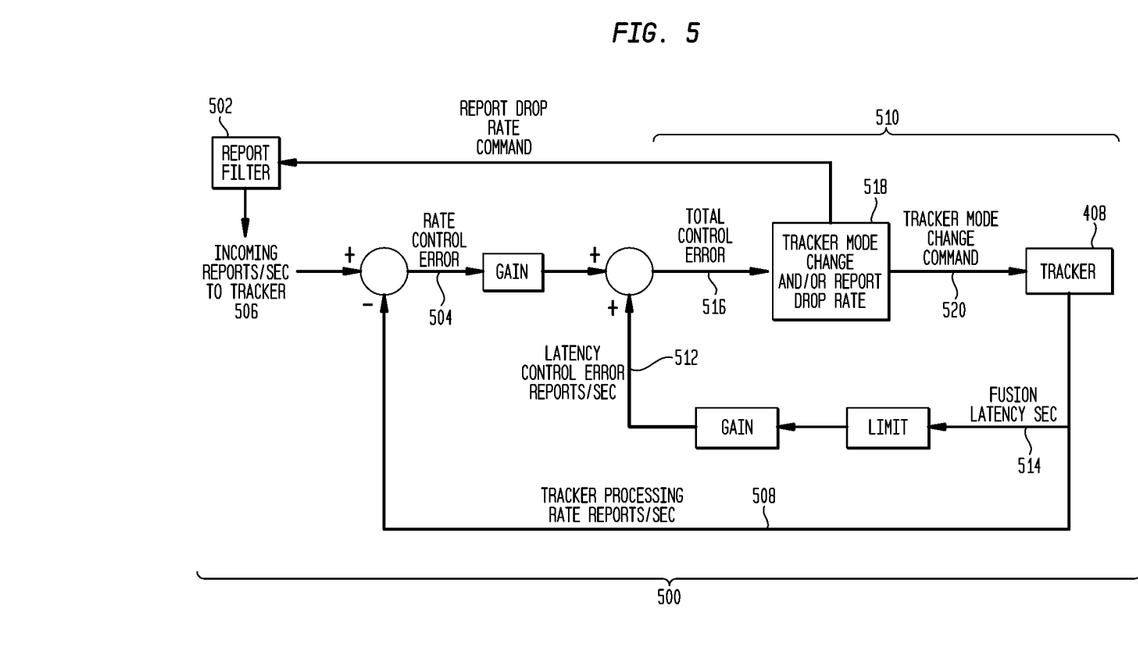
FIG. 5 is an illustration of a process flow of the fusion manager showing two feedback loops used to manage a target tracker running on a node of one embodiment of the dynamic fusion management system and method.

Referring now to FIG. 5, in the outer feedback control loop 500, the reports filter 502 receives sensor reports and calculates the incoming report rate 506. The filter 502 may drop some reports, and it passes the rest to the tracker 408. The rate control error term 504 is the difference of the incoming report rate 506 and the tracker processing rate 508. In the inner feedback control loop 510, latency control error 512 is derived from latency 514 measured in the tracker 408 (the time to fuse a report, primarily the time spent in the track input queue). The total control error term 516, the sum of rate 504 and latency control errors 512, determines a tracker mode change and/or a report drop rate 518. The purpose of the inner feedback control loop 510 is to avoid the situation where a steady state could be reached in which incoming report rate 506 is equal to tracker processing rate 508 but the tracker queue size is still large, hence causing large tracker latency 514.

The FM 404 controls tracker fusion latency 514 by switching tracker modes 520 and by dropping sensor reports as necessary. It also controls fusion quality by switching to a better tracker mode 520 when the tracker's processing rate 508 is higher than the incoming report rate 506.

The embodiments of the invention shown in the drawings and described above are exemplary of numerous embodiments that may be made within the scope of the appended claims. It is contemplated that numerous other configurations of a dynamic fusion management system and method may be created taking advantage of the disclosed approach. It is the applicant's intention that the scope of the patent issuing herefrom will be limited only by the scope of the appended claims.

What is claimed is:

1. A system for managing nodes on a network, comprising:
a plurality of nodes, each node reporting a sensor data to every other node of said plurality of nodes, and each node including a tracker for fusing a plurality of said sensor data from said plurality of nodes into a target track using a data fusion algorithm;
a tracker manager monitoring said trackers and modifying said data fusion algorithm to change between a faster processing mode and a higher quality processing mode based at least in part upon a volume of said plurality of said sensor data received by a tracker; and
a clustering unit that groups said plurality of nodes into a plurality of subnets;
wherein said tracker manager modifies said data fusion algorithm based at least in part upon a criteria selected from the group consisting of a data accuracy requirement, a data priority requirement, and a mission objective requirement;
wherein each node of said plurality of nodes reports said sensor data to each of the other nodes in said plurality of nodes by sending a sensor message to the reported-to node at a first rate if the reporting node and the reported-to node are in a same subnet, and at a second rate if the reporting node and the reported-to node are in a different subnet, said second rate being substantially lower than said first rate; and
wherein said clustering unit groups said plurality of nodes as a function of a connection time during which one or more of said nodes has shared a direct connectivity communications link with another of said nodes, and as a function of an environmental impairment of the direct connectivity communications link between said one or more of said nodes and said another of said nodes.

2. The system of claim 1, wherein said first rate is between two and twenty times higher than said second rate.

3. The system of claim 1, wherein said clustering unit groups said plurality of nodes as a function of a distance between each of said nodes.

4. The system of claim 1, wherein said clustering unit groups said plurality of nodes as a function of an area of responsibility of each of said nodes.

5. The system of claim 1, wherein said clustering unit periodically groups said plurality of nodes into a plurality of subnets.

6. The system of claim 1, wherein said tracker manager instructs said tracker to drop at least one of said sensor data before processing by said data fusion algorithm.

7. The system of claim 1, wherein said clustering unit may be provided with a "max double" value designating a pair of nodes in said plurality of nodes which cannot be grouped within the same subnet, wherein said clustering unit creates a proximity matrix representing a disjoint clustering of individual nodes in said plurality of nodes, wherein said clustering unit repeatedly clusters least-dissimilar pairs of clusters in the proximity matrix until (1) a proximity metric calculated between pairs of clusters is equal to the "max double" value for all such pairs or (2) all of the nodes in said plurality of nodes are in the same cluster, whereupon said plurality of nodes are grouped into subnets according to the resultant clusters.

8. The system of claim 7, wherein an impairment of a direct connectivity communications link between said one or more of said nodes and said another of said nodes is designated within the proximity matrix using the "max double" value.

9. A method for sharing sensor data between a plurality of nodes on a network, each node including a tracker for fusing a plurality of said sensor data from said plurality of nodes into a target track using a data fusion algorithm, the method comprising:
grouping a plurality of nodes into a plurality of subnets based at least in part upon a connection time during which a first node of said plurality of nodes has shared a direct connectivity communications link with another of said plurality of nodes, and upon an environmental impairment to the direct connectivity communications link between said first node and said another of said plurality of nodes;
sharing a sensor data reported by said first node with every other node of said plurality of nodes by:
(a) sending sensor messages at a first rate between said first node and each other node in a common subnet; and
(b) sending sensor messages at a second rate between said first node and each other node of said plurality of nodes not in the common subnet, wherein said first rate is greater than said second rate;
fusing said plurality of said sensor data from said plurality of nodes into said target track using said data fusion algorithm;
modifying said data fusion algorithm to change between a faster processing mode and a higher quality processing mode based upon a volume measurement of said sensor data received by a tracker and a data fusion processing capability of said tracker; and
modifying said data fusion algorithm based at least in part upon a criteria selected from the group consisting of a data accuracy requirement, a data priority requirement, and a mission objective requirement.

10. The method of claim 9, wherein said grouping is also based at least in part upon a criteria selected from the group consisting of a common mission objective, a distance between said first node and another of said plurality of nodes, and a previous grouping between said first node and another of said plurality of nodes.

11. The method of claim 9, further comprising:
discarding a sensor data, before processing by said data fusion algorithm, based at least in part upon said volume measurement.

12. The method of claim 9, further comprising:
discarding a sensor data based at least in part upon a mission objective.

13. The method of claim 9, further comprising:
receiving an information from said first node, said information selected from the group consisting of a modified mission objective, a connection time during which said first node has shared a direct connectivity communications link with another of said plurality of nodes, a change in distance between said first node and another of said plurality of nodes, and an environmental impairment to a direct connectivity communications link between the first node and another of said plurality of nodes; and
performing said step of grouping said plurality of nodes into a plurality of subnets based at least in part upon said information.

14. The method of claim 9, wherein said wherein said first rate is between two and twenty times faster than said second rate.

15. The method of claim 9, wherein a "max double" value designates a pair of nodes in said plurality of nodes which cannot be grouped in the same subnet, and wherein the step of grouping a plurality of nodes into a plurality of subnets comprises:
creating a proximity matrix representing a disjoint clustering of individual nodes in said plurality of nodes;
repeatedly clustering least-dissimilar pairs of clusters in the proximity matrix until (1) a proximity metric calculated between pairs of clusters is equal to the "max double" value for all such pairs or (2) all of the nodes in said plurality of nodes are in the same cluster; and
grouping said plurality of nodes into subnets according to the clusters output from the repeated clustering.

16. The method of claim 15, wherein an impairment of a direct connectivity communications link between said one or more of said nodes and said another of said nodes is designated within the proximity matrix using the "max double" value.

* * * * *